United States Patent
Simonsson et al.

(10) Patent No.: US 9,474,030 B2
(45) Date of Patent: Oct. 18, 2016

(54) CONDITIONAL RANGE EXPANSION IN A HETEROGENEOUS TELECOMMUNICATIONS SYSTEM

(75) Inventors: Arne Simonsson, Gammelstad (SE); Jonas Fröberg Olsson, Ljungsbro (SE); Peter Ökvist, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 91 days.

(21) Appl. No.: 14/398,591

(22) PCT Filed: May 7, 2012

(86) PCT No.: PCT/SE2012/050483
§ 371 (c)(1),
(2), (4) Date: Nov. 3, 2014

(87) PCT Pub. No.: WO2013/169152
PCT Pub. Date: Nov. 14, 2013

(65) Prior Publication Data
US 2015/0126238 A1    May 7, 2015

(51) Int. Cl.
*H04W 36/00* (2009.01)
*H04W 52/18* (2009.01)
(Continued)

(52) U.S. Cl.
CPC ............ *H04W 52/18* (2013.01); *H04W 52/36* (2013.01); *H04W 36/0083* (2013.01); *H04W 36/04* (2013.01); *H04W 52/365* (2013.01); *H04W 52/367* (2013.01); *H04W 84/045* (2013.01)

(58) Field of Classification Search
None
See application file for complete search history.

(56) References Cited

U.S. PATENT DOCUMENTS

2002/0187784 A1* 12/2002 Tigerstedt ......... H04W 36/0088
455/439
2005/0030895 A1* 2/2005 Zeira .................... H04L 1/0002
370/231
(Continued)

FOREIGN PATENT DOCUMENTS

| WO | 2010036188 A1 | 9/2009 |
| WO | 2012008957 A1 | 1/2012 |
| WO | 2012047144 A1 | 4/2012 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 8)", 3GPP TS 36.213 V8.8.0, Sep. 2009, 1-77.
(Continued)

*Primary Examiner* — Dominic Rego
(74) *Attorney, Agent, or Firm* — Patent Portfolio Builders, PLLC

(57) ABSTRACT

A method is disclosed for use in a heterogeneous telecommunications system of the kind comprising a macro base station and a low-power base station, the low-power base station having a coverage which is extendible by range expansion, RE, to serve a user equipment which would otherwise have been served by the macro base station. According to the method, which is performed in either of the macro base station or the low-power base station, information about radio conditions of the user equipment at least with respect to the macro base station is obtained (310). Based on the obtained information, it is determined (320) whether a criterion for conditional range expansion is satisfied, said criterion being related to the uplink transmission power of the user equipment to the macro base station. Accordingly, range expansion is applied (330) for the user equipment only when the criterion is satisfied. A corresponding base station, telecommunications system and computer readable storage medium are also disclosed.

20 Claims, 6 Drawing Sheets

(51) Int. Cl.
*H04W 52/36* (2009.01)
*H04W 84/04* (2009.01)
*H04W 36/04* (2009.01)

(56) References Cited

U.S. PATENT DOCUMENTS

| | | | |
|---|---|---|---|
| 2008/0101306 A1* | 5/2008 | Bertrand | H04L 27/2613 370/336 |
| 2008/0123574 A1* | 5/2008 | Sandhu | H04B 7/15521 370/311 |
| 2008/0227479 A1* | 9/2008 | Iwata | H04W 52/228 455/522 |
| 2008/0242301 A1* | 10/2008 | Osterling | H04W 36/08 455/436 |
| 2009/0291686 A1* | 11/2009 | Alpert | H04W 36/0083 455/436 |
| 2010/0172300 A1* | 7/2010 | Qiu | H04L 1/0009 370/328 |
| 2011/0021240 A1* | 1/2011 | Hiltunen | H04J 11/0086 455/522 |
| 2011/0128930 A1* | 6/2011 | Furuskar | H04L 1/0003 370/329 |
| 2011/0228883 A1* | 9/2011 | Liu | H04L 1/08 375/341 |
| 2011/0249579 A1* | 10/2011 | Hu | H04L 5/001 370/252 |
| 2011/0317635 A1* | 12/2011 | Swaminathan | H04W 36/0088 370/329 |
| 2012/0026972 A1 | 2/2012 | Miao et al. | |
| 2012/0034910 A1* | 2/2012 | Fang | H04W 28/16 455/422.1 |
| 2012/0034926 A1* | 2/2012 | Damnjanovic | H04B 7/022 455/450 |
| 2012/0113844 A1* | 5/2012 | Krishnamurthy | H04L 1/0026 370/252 |
| 2012/0122472 A1* | 5/2012 | Krishnamurthy | H04L 5/0053 455/456.1 |
| 2013/0107705 A1* | 5/2013 | Dinan | H04W 72/0446 370/230 |
| 2013/0114434 A1* | 5/2013 | Muruganathan | H04W 16/14 370/252 |
| 2013/0157652 A1* | 6/2013 | Khaitan | H04W 52/16 455/422.1 |
| 2013/0244664 A1* | 9/2013 | Song | H04W 36/0083 455/437 |
| 2014/0206362 A1* | 7/2014 | Xu | H04W 48/20 455/444 |

OTHER PUBLICATIONS

Unknown, Author, "Reporting events for UE internal measurements", TSG-RAN Working Group 2 (Radio layer 2 and Radio layer 3), TSGR2#4(99)421, Ericsson, Berlin, Germany, May 25-28, 1999, 1-3.

Office Action in EP application No. 12876244.0 mailed Jan. 11, 2016.

Unknown, Author, "Renesas Mobile Europe Ltd.", Discussion on Rel'11 eICIC Scenarios, Renesas Mobile Europe Ltd., 3GPP TSG-RAN WG1 Meeting #66, R1-112798, Athens, Greece, Aug. 22-26, 2011, 1-12.

Unknown, Author, "Short-stay and ping-pong handover issues in high-speed scenarios", New Postcom, 3GPP TSG RAN WG3 Meeting #73bis, R3-112445, Zhuhai, China, Oct. 10-14, 2011, 1-4.

Office Action in EP application No. 12876244.0 mailed Jun. 11, 2015.

* cited by examiner

CONDITIONAL RANGE EXPANSION IN A HETEROGENEOUS TELECOMMUNICATIONS SYSTEM

TECHNICAL FIELD

This invention relates to mobile telecommunication, and in particular to a method for use in a heterogeneous telecommunications system of the kind comprising a macro base station and a low-power base station, the low-power base station having a coverage which is extendible by range expansion, RE, to serve a user equipment which would otherwise have been served by the macro base station. The present invention also relates to a corresponding base station, telecommunications system and computer readable storage medium.

BACKGROUND

Contemporary 4G telecommunications systems, such as LTE system (Long Term Evolution), have to meet ever increasing needs for higher data rates and improved network capacity. Particularly for environments where the users are highly clustered, a densified infrastructure may be appropriate, where multiple low-power base stations are installed to complement a macro base station which provides basic coverage in the cell. Hence, a heterogeneous telecommunications system is provided, having two—or even more—cell layers. Depending on its transmission power capacity compared to the macro cell, a low-power base station in a heterogeneous telecommunications system is often referred to as a micro base station, pico base station, femto base station, etc. For the rest of the present disclosure, however, the term low-power base station will be used to collectively refer to any such base station.

FIGS. 2A and 2B schematically illustrate an exemplary heterogeneous telecommunications system 200, in which one macro base station 210 and one low-power base station 220 are arranged. Of course, a real-world implantation will contain a large number of macro base stations and a multitude of low-power base stations within at least some of the cells defined by the respective macro base stations. In the illustrated example, the heterogeneous telecommunications system 200 is LTE compliant; hence the macro base station 210 and the low-power base station 220 may alternatively be referred to as evolved Node B:s (eNB:s). The macro base station 210 has a coverage denoted as 202, whereas the low-power base station 220 has a nominal coverage 222, or uptake area, which is essentially confined within the coverage 202 of the macro base station 210.

The basic handover principle in any cellular telecommunications system is that a mobile terminal, from now on referred to as a user equipment or UE, connects to the base station from which the downlink signal strength is the highest. In FIG. 2A, the downlink signal strength is denoted with solid lines. At a first virtual border 286, the downlink signal strength as perceived by a UE 230 is essentially equally strong from the macro base station 210 and the low-power base station 220. Hence, as seen in FIG. 2B, when the UE is at a position 230b, the UE will connect to the macro base station 210, as seen at 232b, since the downlink signal strength from the macro base station 210 is the stronger. Conversely, when the UE is at a position 230a on the other side of the border 286, the UE will connect to the low-power base station 220, as seen at 232a.

However, due to the difference in transmission power between the low-power base station 220 and the overlying macro base station 210, this basic handover principle may not necessarily result in the UE connecting to the base station to which it has the lowest path loss. In FIG. 2A, the path loss is denoted with dashed lines. At a second virtual border 288, the path loss for the UE 230 is the essentially the same to the macro base station 210 as to the low-power base station 220. In effect, therefore, there is a transition zone 284, outside of the nominal coverage 222 of the low-power base station 220, in which the UE 230 experiences a higher downlink signal strength from the macro base station 210 but a lower path loss to the low-power base station 220.

The coverage or uptake area of the low-power base station 220 can therefore be extended to a broader coverage 224 by including also the transition zone 284. This feature is referred to as Range Expansion (RE) and is available already in the first release of LTE, Rel-8. Known synonyms are Range Extension (RE) and Cell Selection Offset (CSO); the feature will however be collectively referred to as range expansion throughout this document.

Range expansion does not increase the transmission power of the low-power base station 220; instead an offset is added to the received downlink signal strength in the cell-selection mechanism for the UE 230. In the exemplary situation shown in FIG. 2B where the UE 230 is within the transition zone 284, the cell-selection mechanism will cause the UE 230 to select and connect 232' to the low-power base station 220 by applying range expansion. If range expansion had not been available, the UE 230 would instead select and connect 232 to the macro base station 210. Range expansion is a feature which can be used for the purpose of achieving high uplink data rates, for load balancing between the cell layers (for instance to offload the macro layer), and for improving the robustness by enlarging the low-power base station's coverage to reduce its sensitivity to ideal placement in a traffic hotspot.

Despite the apparent advantages as presented above, the present inventors have identified some drawbacks with range expansion.

In a densely planned network, the uplink to the macro base station can be very good around the low-power base station, and the UE may reach maximum MCS (Modulation and Coding Scheme) and uplink bit-rate to the macro base station. In such a situation there will be no gain from applying range expansion, only a loss in downlink bit-rate. This is so because connecting to the low power base station will degrade the downlink, where, in contrast to uplink, there are always Reference Signals (RS) and control signals transmitted. This results in lower received signal strength and downlink bit-rate. The problem is particularly pronounced for lower frequency bands, e.g. at 800 MHz, with less propagation loss.

Also in more sparsely planned networks, some UE:s may still have a very good uplink to the macro base station in the transition zone. This may for instance be the case for outdoor UE:s with line-of-sight to the macro base station.

There is thus a need for an improved manner in which range expansion is applied in a heterogeneous telecommunications system.

SUMMARY

It is accordingly an object of the invention to eliminate or alleviate one or more of the problems referred to above.

The present inventors have realized, after inventive and insightful reasoning, that range expansion can be applied conditionally by assessing the uplink transmission power of the user equipment so as to avoid applying range expansion when there is no real benefit from doing so.

One aspect of the present invention therefore is a method for use in a heterogeneous telecommunications system, said telecommunications system comprising a macro base station and a low-power base station, the low-power base station having a coverage which is extendible by range expansion, RE, to serve a user equipment which would otherwise have been served by the macro base station. The method comprises, in either of the macro base station or the low-power base station:

obtaining information about radio conditions of the user equipment at least with respect to the macro base station;

determining, based on the obtained information, whether a criterion for conditional range expansion is satisfied, said criterion being related to the uplink transmission power of the user equipment to the macro base station; and applying range expansion for the user equipment only when the criterion is satisfied.

Advantageously, the criterion may pertain to the user equipment being subject to power limitation, i.e. that the user equipment has reached a maximum uplink transmission power.

Alternatively, the criterion may pertain to the uplink transmission power of the user equipment exceeding a threshold uplink transmission power. The threshold uplink transmission power may, for instance, be expressed as a negative offset from maximum uplink transmission power, or a percentage of the maximum uplink transmission power.

As yet an alternative, the criterion may pertain to maximum bit-rates not being reachable for uplink data traffic from the user equipment to the macro base station.

Still an alternative is that the criterion pertains to maximum modulation and coding scheme, MCS, not being reachable for uplink data traffic from the user equipment to the macro base station.

A further alternative is that the criterion pertains to a signal to interference and noise ratio, SINR, or signal to noise ratio, SNR, for the uplink from the user equipment to the macro base station not meeting a threshold for maximum modulation and coding scheme, MCS.

It is envisaged that the criterion may be a combination of two or more of the alternatives given above in some embodiments.

An advantage which is obtainable by the first aspect of the invention is that the downlink bit-rate may be improved in a heterogeneous telecommunications system, thanks to the avoidance or reduced tendency of applying range expansion when there is no real benefit for the user equipment from doing so. Another advantage which may be obtainable by the first aspect of the invention is a saving in planning costs since the range expansion feature will be given a self configuring nature.

In one or more embodiments, the information about the radio conditions of the user equipment is obtained by receiving one or more reports originating from the user equipment, where the aforementioned one or more reports from the user equipment include measurements made by the user equipment regarding the received power of a reference signal from the macro base station and neighboring base stations in the telecommunications system. Specifically, in an embodiment where the telecommunications system is LTE compliant, the measurements made by the user equipment regarding the received power of the reference signal may be RSRP (Reference Signal Received Power) measurements being communicated in RRC (Radio Resource Control) handover measurement reports. In alternative embodiments, however, the information about the radio conditions of the user equipment may be obtained in other ways than receiving reports from the user equipment, as will be explained in more detail in the Detailed Description section.

After having received the aforementioned one or more reports from the user equipment, the method according to one embodiment further involves:

analyzing said one or more reports to determine whether the user equipment is positioned in a transition zone where the downlink signal strength from the macro base station to the user equipment is the highest, but the uplink path loss from the user equipment is lower to the low-power base station than to the macro base station, and aborting further execution of the method if the user equipment is found not to be positioned in the transition zone.

In one embodiment, the determination about whether or not the criterion for conditional range expansion is satisfied involves:

estimating an uplink path loss from the user equipment to the macro base station based on measurements included in said one or more reports from the user equipment and made by the user equipment regarding the received power of a reference signal from the macro base station;

estimating an uplink transmission power of the user equipment based on the estimated uplink path loss from the user equipment to the macro base station; and determining that said criterion for conditional range expansion is satisfied, if the estimated uplink transmission power reaches a predefined maximum power.

In another embodiment, the determination about whether or not the criterion for conditional range expansion is satisfied involves:

receiving one or more power headroom reports from the user equipment;

estimating an uplink received signal to interference and noise ratio, SINR, or signal to noise ratio, SNR, for the uplink between the user equipment and the macro base station based on the power headroom reports and a scheduled bandwidth of the user equipment; and determining that said criterion for conditional range expansion is satisfied, if the estimated SINR or SNR fails to reach a predefined threshold value representing maximum modulation and coding scheme, MCS.

In one or more embodiments, when it has been determined that range expansion is to be applied for the user equipment, it is effectuated by sending a control message (such as an RRC handover control message in an LTE-compliant embodiment) to the user equipment, wherein said control message causes the user equipment to apply a certain offset to the received downlink signal strength for the low-power base station, so as to change the low-power base station's uptake area in the user equipment's cell-selecting mechanism.

In this or these embodiments, the offset applied to the received downlink signal strength for the low-power base station will have a positive value, which serves to increase the low-power base station's uptake area compared to a case where no offset is applied. This means that as a default, range expansion is not applied. Once it has been determined that the criterion for conditional range expansion is satisfied, range expansion may be applied by causing the user equipment to add an offset to the low-power base station's received downlink signal strength when selecting which cell (i.e., base station) to connect to.

As an alternative, the user equipment is by default caused to apply a certain offset to the received downlink signal strength for the low-power base station, so as to increase the low-power base station's uptake area in the user equipment's cell-selecting mechanism. The user equipment is then caused to remove this offset in response to determining that the criterion for conditional range expansion is not satisfied. Thus, in this alternative embodiment, range expansion is applied as a default for all pieces of user equipment appearing in the transition zone. Once it has been determined that the criterion for conditional range expansion is in fact not satisfied, range expansion is disabled for the individual user equipment.

One or more embodiments may involve beneficial cooperation between the base stations. To this end, the receiving of the aforesaid one or more reports originating from the user equipment may involve receiving the reports as forwarded from one of said macro base station and said low-power base station to the other of said macro base station and said low-power base station.

A second aspect of the invention is a base station for use in a telecommunications system which comprises a macro base station and a low-power base station, the low-power base station having a coverage which is extendible by range expansion, RE, to serve a user equipment which would otherwise have been served by the macro base station. The base station comprises:

a memory for storing instructions and data;
a radio-frequency interface for communicating with said user equipment; and
a controller, wherein the controller is configured to:
 obtain information about radio conditions of the user equipment at least with respect to the macro base station;
 determine, based on the obtained information, whether a criterion for conditional range expansion is satisfied, said criterion being related to the uplink transmission power of the user equipment to the macro base station; and
 apply range expansion for the user equipment only when the criterion is satisfied.

The controller of the base station according to the second aspect of the invention may further be configured to perform the functionality of the method according to the first aspect of the invention.

The base station according to the second aspect of the invention may be either said macro base station or said low-power base station.

A third aspect of the invention is a telecommunications system comprising:

a user equipment; and one of the following:
 the macro base station according to the second aspect of the invention and a low-power base station;
 or
 the low-power base station according to the second aspect of the invention and a macro base station.

A fourth aspect of the invention is a computer readable storage medium encoded with instructions that, when loaded and executed by a processor, causes performance of the method according to the first aspect of the invention.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated. It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Embodiment of the invention will be described in further detail below with reference to the accompanying drawings.

DETAILED DESCRIPTION

Figure 1:
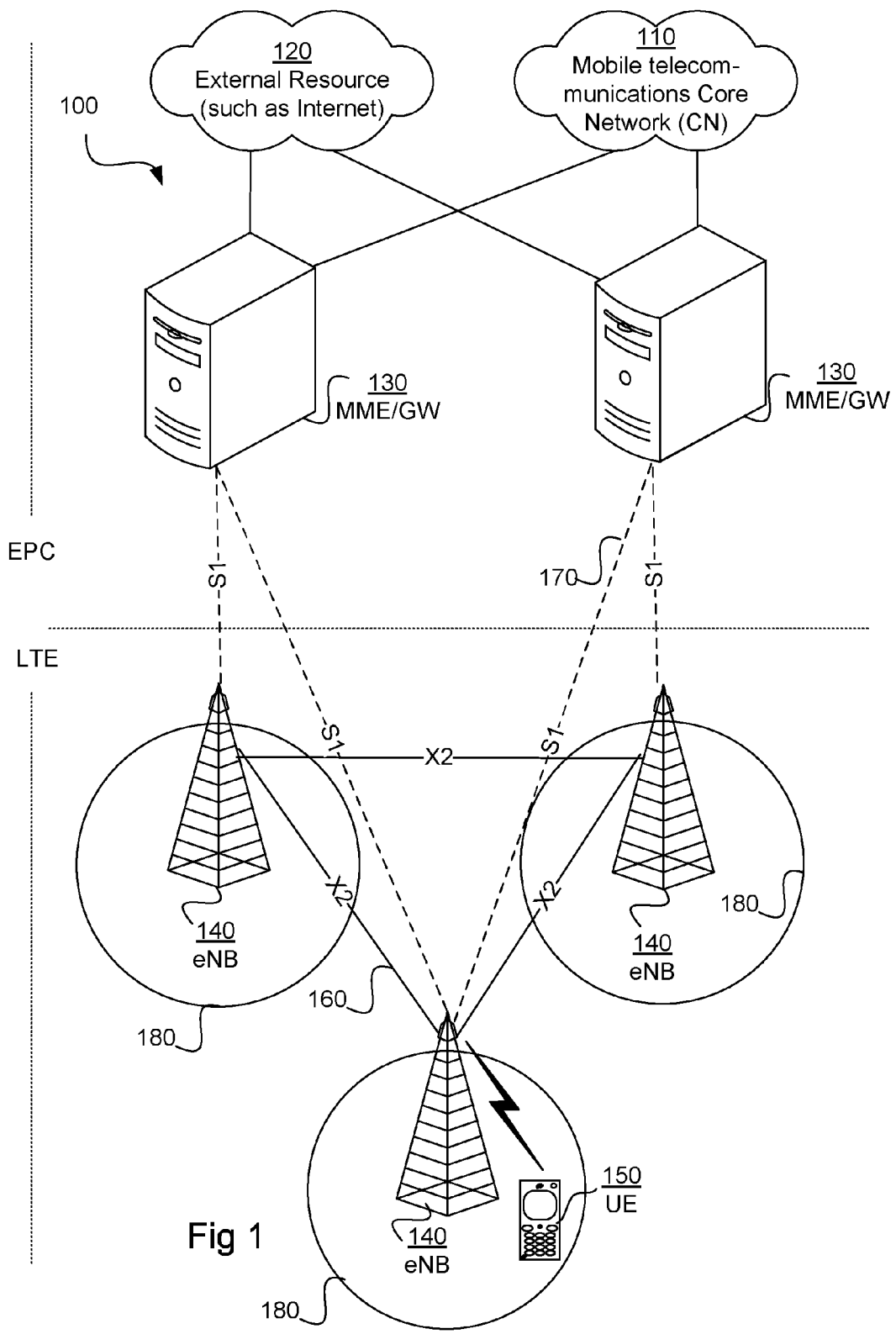
FIG. 1 is a schematic illustration of a non-limiting example of a telecommunication system in which embodiments of the present invention may take part.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 shows a schematic view of the general structure of a telecommunications system 100 in which embodiments of the present invention may take part. The telecommunications system 100 is an Evolved Packet System (EPS) system which comprises at least one server 130, such as a Mobility Management Entity (MME) and/or a Gateway (GW). In FIG. 1, two such servers 130 are shown. The servers 130 are configured to communicate with a mobile telecommunications core network (CN) 110 and/or an external resource 120 such as the internet. The servers 130 are configured to communicate with other devices using a packet switched technology or protocol, thereby forming an Evolved Packet Core (EPC) layer.

Figure 5:
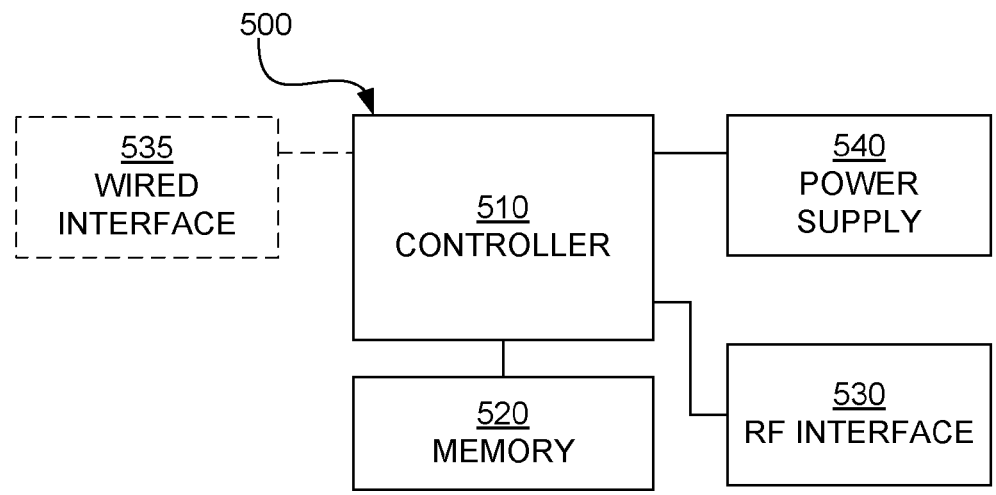
FIG. 5 is a schematic block diagram of a base station according to one embodiment.

The servers are configured to communicate with nodes, also referred to as base stations 140. FIG. 5 gives a more detailed view of the general structure of such a base station. In FIG. 1, each base station 140 is an evolved Node B (eNB).

The communication between a server 130 and a base station 140 is effected through a standard or protocol 170, also referred to as S1. Communication between the base stations 140 is effected through a standard or protocol 160, also referred to as X2, where proprietary messages can be added or, alternatively, the standard be extended, as appropriate for an actual implementation of the system 100. Each base station 140 is further configured to handle or service a cell 180. The base stations 140 form a Long Term Evolution (LTE) layer or an LTE Advanced layer.

Each base station 140 is configured to communicate with a number of mobile telecommunications devices present within its cell 180 through a wireless radio frequency protocol. In FIG. 1, only one such mobile telecommunications device is shown in the form of a UE 150.

In FIG. 1, the cells 180 are shown as non-overlapping. However, in reality the cells will typically be overlapping to some extent, in order to permit smooth handover between cells as the UE 150 is moving. Also, in FIG. 1, the cells 180 are shown as having a modest coverage. However, in reality, when the base station 140 is a macro base station, such a macro cell 180 may have a radius of up to and around 100 km. When the base station 140 is a low-power base station, such a low-power (micro, pico, femto) cell may have a radius in the order of 10-100 m.

Figure 2A:
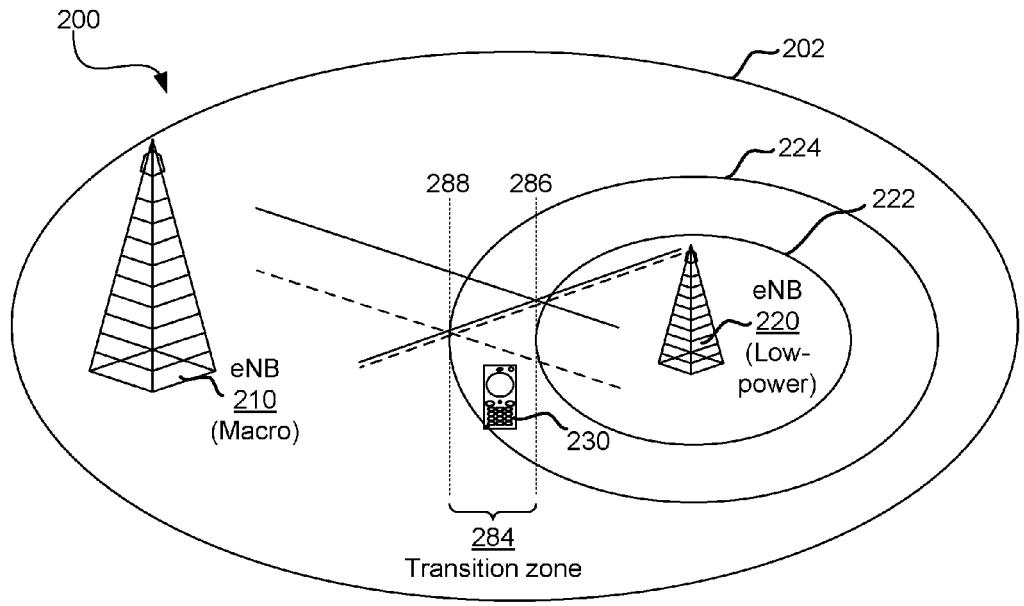
FIG. 2A is a schematic illustration of an exemplary heterogeneous telecommunication system, showing one macro base station and one lower-power base station.
Figure 2B:
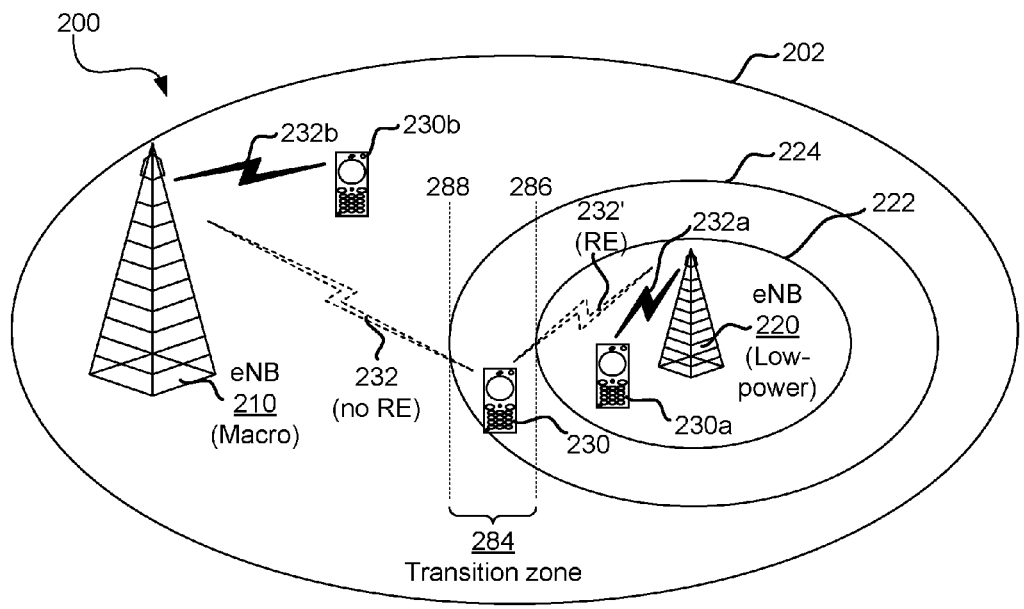
FIG. 2B illustrates the concept of range expansion in the exemplary heterogeneous telecommunication system of FIG. 2A.

The heterogeneous telecommunication system 200, which has already been described in the Background section with reference to FIGS. 2A and 2B, may be part of the telecommunications system 100 shown in FIG. 1. Hence, the macro base station 210 of FIGS. 2A and 2B may be any of the base stations 140 shown in FIG. 1. The low-power base station 220 of FIGS. 2A and 2B may be any of the base stations 140 shown in FIG. 1, or it may be confined within the cell 180 of any of these base stations 140.

The relation between the macro base station 210 and the low-power base station 220 will typically be either such that the low-power base station 220 has a coverage 222 which is essentially confined within the coverage 202 of the macro base station 210 (like the situation shown in FIGS. 2A and 2B), or such that the low-power base station 220 is located at the cell edges of a plurality of adjacent macro base stations.

The heterogeneous telecommunication system 200 is adapted for range expansion, as is illustrated in FIG. 2B and was explained already in the Background section.

Figure 3:
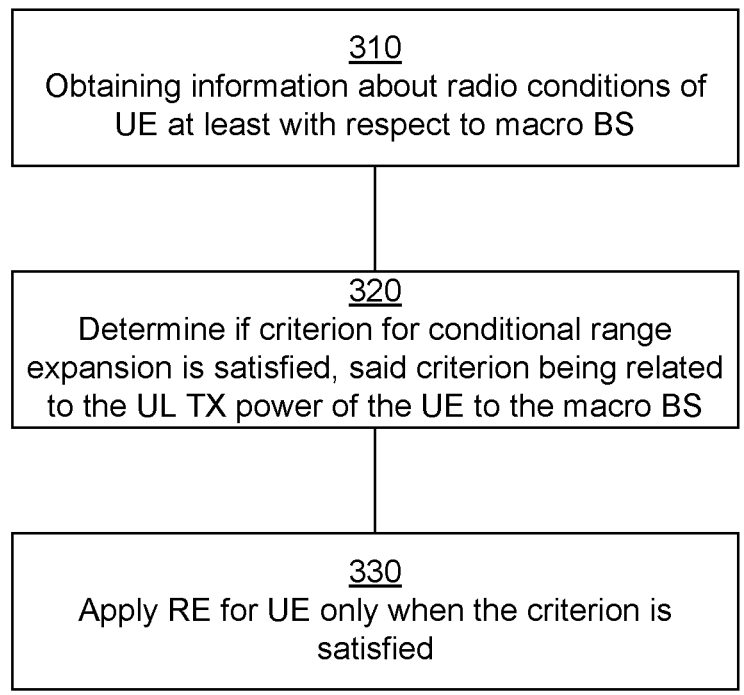
FIG. 3 is a schematic flowchart diagram to illustrate the inventive concept.

Reference is now made to FIG. 3, which illustrates the inventive concept of applying range expansion conditionally based on an assessment of the uplink transmission power of a certain user equipment (UE) 230, so as to avoid applying range expansion when there is no real benefit from doing so. The functionality in FIG. 3 may be performed in either the macro base station 210 or the low-power base station 220.

In a first step 310, the base station obtains information about radio conditions of the UE 230 at least with respect to the macro base station 210. In typical embodiments, such information is obtained by the base station receiving one or more reports originating from the UE 230. Specific examples of such reports will be given below with reference to FIGS. 4A and 4B. Generally speaking, however, any reports can be used which allow an assessment of the uplink transmission power of the UE 230 to the macro base station 210. For instance, reports which include measurements made by the UE 230 regarding the received power of a reference signal from the macro base station 210 and neighboring base stations in the telecommunications system 200 may be used for the purpose of the method in FIG. 3. In alternative embodiments, the base station does not rely on such measurements made by the UE 230 in order to obtain the information about the radio conditions of the UE 230. Instead, the base station will use other information in such alternative embodiments, as will be explained in more detail later in this section.

In a second step 320, the base station determines, based on the obtained information (e.g. the received report(s)), whether a criterion for conditional range expansion is satisfied, said criterion being related to the uplink transmission power of the UE 230 to the macro base station 210. The criterion for conditional range expansion may typically pertain to at least one of the following:

whether the UE 230 is subject to power limitation, i.e. that the UE 230 has reached a maximum uplink transmission power, whether the uplink transmission power of the UE 230 exceeds a threshold uplink transmission power, whether maximum bit-rates are not reachable for uplink data traffic from the UE 230 to the macro base station 210, whether maximum modulation and coding scheme, MCS, is not reachable for uplink data traffic from the UE 230 to the macro base station 210, whether a signal to interference and noise ratio, SINR, or signal to noise ratio, SNR, for the uplink from the UE 230 to the macro base station 210 meets a threshold for maximum MCS.

Only when this criterion has been found to be satisfied will range expansion be applied for the UE 230 in a subsequent step 330.

All of the factors listed above are relevant in some way or the other for the criterion for conditional range expansion, because of the following. For instance, if the UE 230 reaches its maximum uplink transmission power (which may be 200 mW or 23 dBm in LTE), there is a high uplink path loss to the macro base station 210, and consequently maximum bit-rates are not reachable for the uplink to the macro base station 210. Hence, the UE 230 will benefit from being subjected to range expansion to enjoy a lower path loss offered by the low-power base station. Also, maximum modulation and coding scheme, MCS, which is a requisite for maximum bit-rates, requires a sufficient SINR (or SNR), and the SINR in turn depends on the uplink path loss. In LTE Rel-8, UE:s have 16-QAM as the highest modulation, and the threshold $SINR_{max\_MCS}$ for maximum MCS is at around 15 to 16 dB.

Figure 4A:
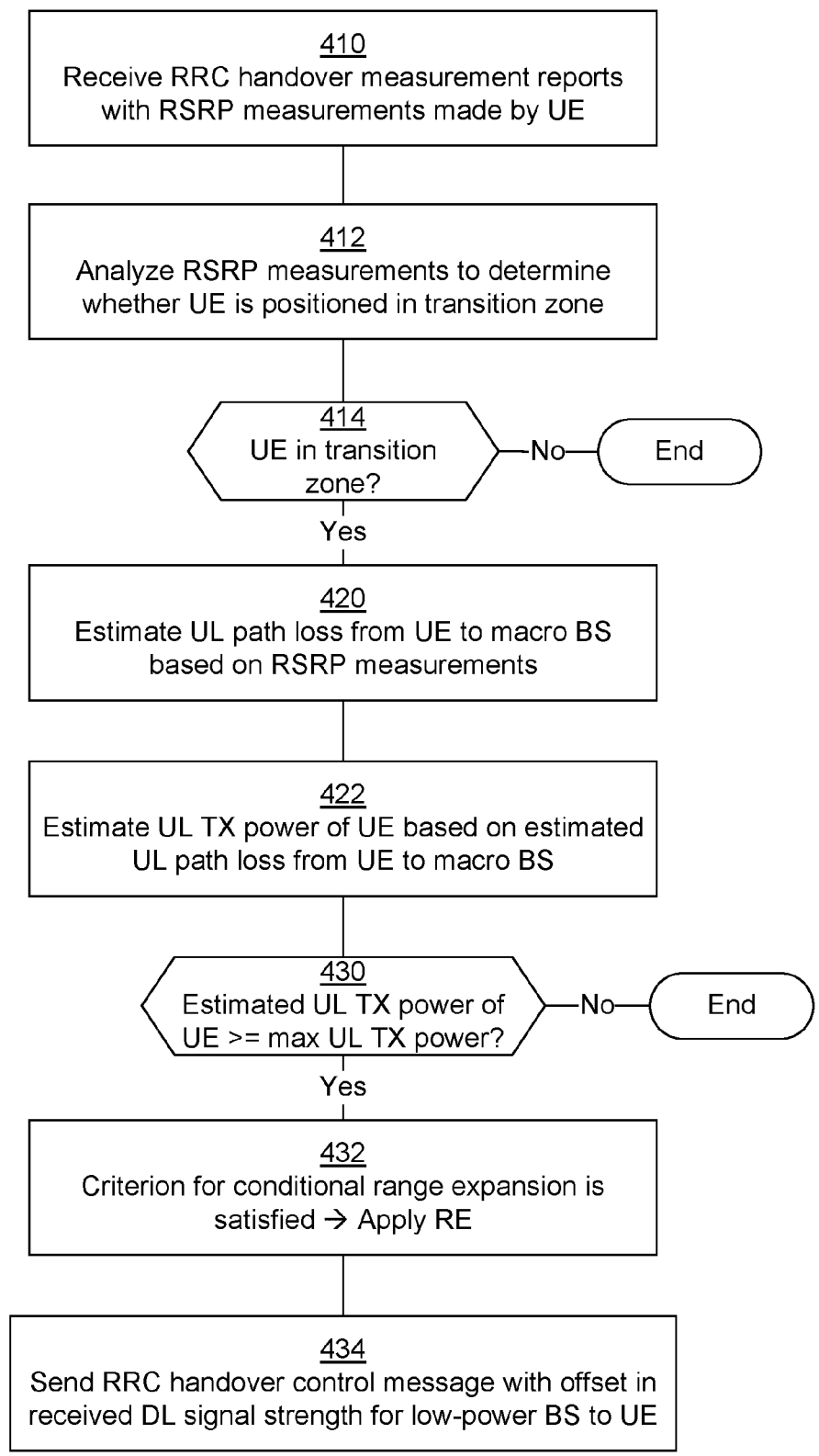
FIG. 4A is a schematic flowchart diagram which illustrates one embodiment of a method according to the invention.

FIG. 4A illustrates one embodiment of a method which operates in accordance with the principles above. The steps of the method shown in FIG. 4A may be performed by a controller 510 in a base station 500, which is described in more detail later with reference to FIG. 5. The base station 500 may be either the macro base station 210 or the low-power base station 220.

In a first step 410, the base station receives one ore more RRC handover measurement reports from the UE 230. The RRC handover measurement reports contain RSRP measurements made by UE 230 concerning the received power of a reference signal from the macro base station 210 and neighboring base stations in the telecommunications system 200.

In a second step 412, the RSRP measurements are analyzed to determine whether the UE 230 is positioned in the transition zone 284, where the downlink signal strength from the macro base station 210 to the UE 230 is higher, but the uplink path loss from the UE 230 is lower to the low-power base station 220 than to the macro base station 210. The analysis may involve assessing the condition $$(RSRP_{macro} - RSRP_{micro}) < (P_{macro} - P_{micro}), \text{ where}$$

$RSRP_{macro}$ is the received power (in dB) by the UE 230 of the reference signal from the macro base station 210, $RSRP_{micro}$ is the received power (in dB) by the UE 230 of the reference signal from the low-power base station 220, $P_{macro}$ is the transmitted power (in dB) by the macro base station 210 of the reference signal, and $P_{micro}$ is the transmitted power (in dB) by the low-power base station 220 of the reference signal.

If in a next step 414 the UE 230 is found not be in the transition zone 284, then further execution of the method is aborted. Otherwise, the execution continues to a step 420.

In step 420, the uplink path loss from the UE 230 to the macro base station 210 is estimated based on RSPR measurements for the macro base station 210, as already received in the RRC handover measurement reports from the UE 230 in step 410. More specifically, in the disclosed embodiment which is LTE-compliant, the uplink path loss, PL, is estimated as $$PL = P_{macro} - RSRP_{macro},$$

where $P_{macro}$ and $RSRP_{macro}$ are defined as already explained above, resulting in a path loss PL in dB. It should be noted that a path loss may be expressed in decibel (dB) using a logarithmic scale, or in Watts (W) using a linear scale converted from the path loss above, as is well known to persons skilled in the art.

Continuing with a step 422, the uplink transmission power of the UE 230 is estimated based on the estimated uplink path loss from the UE 230 to the macro base station 210, with due account being taken to the applicable power control settings and power control algorithm. For the present LTE-compliant embodiment, reference is made to 3GPP Technical Specification 36.213, section 5.1.1.1. Hence, for the present embodiment, the uplink transmission power, $P_{PUSCH}$, is estimated as $$P_{PUSCH}(i) = \min\{P_{MAX}, 10 \log_{10}(M_{PUSCH}(i)) + P_{O\_PUSCH}(j) + \alpha \cdot PL + \Delta_{TF}(i) f(i)\}.$$

The meaning of these parameters are believed to be well known to a person skilled in the art and is moreover explained in detail in the aforementioned 3GPP Technical Specification 36.213, section 5.1.1.1.

Then a check is made in a step 430 if the estimated uplink transmission power reaches a predefined maximum uplink transmission power. If the test in step 430 is affirmative, the execution continues to step 432, in which is it concluded that the criterion for conditional range expansion is satisfied (also see step 320 in FIG. 3). As a result, range expansion is applied for the UE 230 by sending in step 434 a control message to the UE 230. The control message will cause the UE 230 to apply a certain offset to the received downlink signal strength for the low-power base station 220, so as to change the low-power base station's uptake area (from 222 to 224, as seen in FIGS. 2A and 2B) in the UE's cell-selecting mechanism.

For the present LTE-compliant embodiment, the control message may be an RRC handover control message, in which said offset is specified as the parameter cellIndividualOffset, as defined in measObjectEUTRA. For further reference, see 3GPP Technical Specification 36.331, section 5.5.4.4.

Figure 4B:
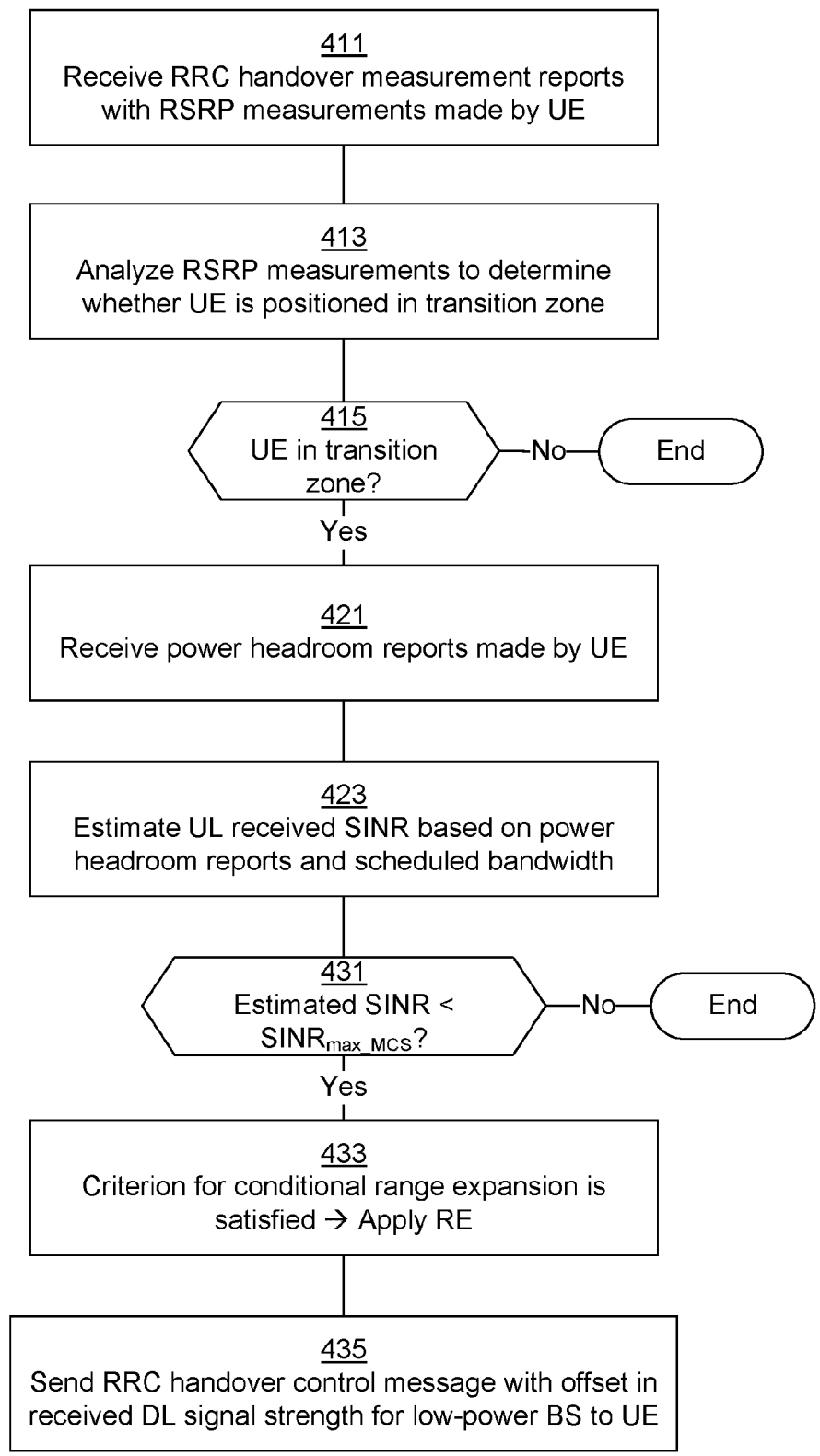
FIG. 4B is a schematic flowchart diagram which illustrates another embodiment of a method according to the invention.

FIG. 4B illustrates another embodiment of a method for conditional range expansion. As with the embodiment of FIG. 4A, the steps of the method shown in FIG. 4B may be performed by the controller 510 in the base station 500, which may be either the macro base station 210 or the low-power base station 220.

A first step 411 is essentially identical to the step 410 described above for FIG. 4A. Hence, the base station receives one ore more RRC handover measurement reports from the UE 230, and the RRC handover measurement reports contain RSRP measurements made by UE 230 concerning the received power of a reference signal from the macro base station 210 and neighboring base stations in the telecommunications system 200.

A second step 413 is essentially identical to the step 412 described above for FIG. 4A, and serves to analyze the RSRP measurements in order to determine whether the UE 230 is positioned in the transition zone 284. A check is made in step 415, similar to step 414 of FIG. 4A.

If the UE 230 was found to be positioned in the transition zone 284, the execution in FIG. 4B continues with a step 421. Here, one or more Power Headroom Reports, PHR:s, are received from the UE 230. For further details about PHR, reference is made to 3GPP Technical Specification 36.321, section 5.4.6.

In a subsequent step 423, an uplink received signal to interference and noise ratio, SINR, is estimated for the uplink between the UE 230 and the macro base station 210, based on the power headroom reports and a scheduled bandwidth of the UE 230.

Then a check is made in a step 431 if the estimated SINR fails to reach a predefined threshold value, $SINR_{max\_MCS}$, representing maximum modulation and coding scheme, MCS. If the test in step 431 indicates that the estimated $SINR < SINR_{max\_MCS}$, the execution continues to step 433, in which is it concluded that the criterion for conditional range expansion is satisfied (also see step 320 in FIG. 3). As a result, range expansion is applied for the UE 230 by sending in step 435 a control message to the UE 230, essentially as already described above for step 434 of FIG. 4A.

Other embodiments can be based on combinations of steps and features from the above described embodiments. For instance, in one alternative embodiment, the uplink transmission power of the UE 230 (cf step 422 in FIG. 4A) is estimated based on received power headroom reports (cf step 421 in FIG. 4B), whereupon it can be checked if the estimated uplink transmission power reaches a predefined maximum uplink transmission power (cf step 430 in FIG. 4A).

In another alternative embodiment, the uplink received SINR can be estimated and checked (cf steps 423 and 430 in FIG. 4B) based on RSRP measurements and estimated uplink transmission power (cf steps 420 and 422 in FIG. 4A).

Still other embodiments may be based on other reports or measurements than the ones referred to above. For instance, Received Signal Strength Indicator (RSSI) measurements or Received Channel Power Indicator (RCPI) measurements may be alternatives to the RSRP measurements made by the UE 230 referred to above.

Alternatively, the conditional range expansion decision may be taken based on uplink Received Signal Strength Indicator (RSSI) or RSPR measurements made in the base station rather than in the UE, hence not requiring reports from the UE 230.

There are further alternative embodiments which are not based on receiving measurement reports made by the UE to get information about the radio conditions of the UE. For instance, an estimation of the uplink path loss (cf step 420 in FIG. 4A) can also be based on measurements made in the base station on uplink transmissions from the UE 230. Such uplink transmissions can be data transmissions, or the specific uplink Sounding Reference Signals (SRS) in LTE which can be turned on for uplink channel estimation. This information can also be used, by cooperation between the macro base station and the lower-power base station, to determine if the UE is in transition zone or not.

Also indirect measurements can be used to estimate when the UE 230 reaches maximum uplink transmission power. Link adaptation is commonly used in LTE and operates to select transport format (MCS) based on link quality. The link adaptation may also include an outer loop adjusting the MCS selection to reach a target retransmission rate. Such a link adaptation function, with or without outer loop, in uplink will identify when maximum MCS is used (cf step 431 in FIG. 4B), hence indicating if maximum uplink transmission power is reached.

Maximum transport format also includes transmission rank when spatial multiplexing (single-user MIMO) is used. Highest MCS may be reached for a certain rank which is lower than the highest possible. Increasing the RE can increase transmission rank, and thereby a higher transport format may be reached and improved uplink bit-rate.

The base station can also obtain information about the radio conditions of the UE 230 by drawing conclusions from the absence of reports from the UE 230. For instance, the aforementioned RRC handover measurement reports (cf step 410 in FIG. 4A and step 411 in FIG. 4B) are typically event triggered; the handover report is only sent when certain requirements are fulfilled. One such requirement can be that the difference in RSRP between the connected cell and the neighbouring cell is below a certain threshold. Hence, if no handover report is received from the UE 230 by the base station, this implicitly indicates a certain minimum difference in RSRP between two cells.

In one embodiment the range expansion is controlled per cell, fraction of cells or cluster of cells based on statistics of collected measurements. For all UE:s identified to be in the transition zone, the fraction of power limited UE:s is measured. These measurements are performed for a longer time, hours to weeks, and range expansion is applied for all UE:s in the whole cell, if the fraction is below a certain fraction threshold.

FIG. 5 shows a schematic view of the general structure of a base station 500 according to one embodiment herein. The base station 500 may for instance be any of the aforementioned base stations (eNB:s) 140, 210 or 220. The base station 500 comprises a controller 510, as already mentioned. The controller 510 may be implemented as at least one CPU (Central Processing Unit), DSP (Digital Signal Processor), FPGA (Field-Programmable Gate Arrays), ASIC (Application Specific Integrated Circuit) or any other electronic programmable logic device, or a combination of any such devices, adapted for executing computer program instructions that may be stored in a memory 520.

The controller 510 is configured to read instructions from the memory 520 and execute these instructions to control the operation of the base station 500, including performing the functionality for providing conditional range expansion as described above in various sections of this document, as well as in FIGS. 3, 4A and 4B.

The memory 520 may be implemented using any commonly known technology for computer-readable memories such as ROM, RAM, SRAM, DRAM, CMOS, FLASH, DDR, SDRAM or some other memory technology. As already mentioned, in the memory 520 there is stored a set of instructions that when executed by the controller 510 will serve to control the operation of the base station 500. The instructions may be downloaded into the memory 520 from an external local device, such as the computer readable storage medium 640 described below with reference to FIG. 6, or from a remote device via a network.

The base station 500 further comprises at least one radio frequency (RF) interface 530. The base station 500 is configured to communicate with mobile communications devices, such as the UE 230, through the at least one RF interface 530. In one embodiment the base station 500 is configured to communicate with other base stations through the at least one RF interface 530. In one embodiment the radio frequency interface is an X2 interface.

In one embodiment the base station 500 further comprises a wired interface 535. In such an embodiment the base station 500 is configured to communicate with other base stations or a server through the wired interface 535. The base station 500 also comprises a power supply 540.

Figure 6:
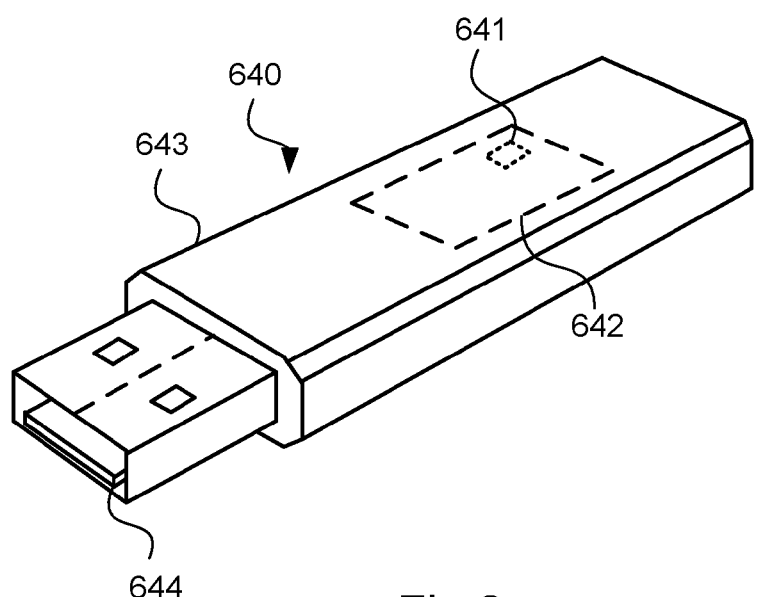
FIG. 6 is a schematic illustration of a computer readable storage medium according to one embodiment.

FIG. 6 shows a schematic view of a computer readable storage medium 640 which may be used to accommodate instructions for performing the functionality of the present invention. In the embodiment shown in FIG. 6, the computer-readable medium 640 is a memory stick, such as a Universal Serial Bus (USB) stick. The USB stick 640 comprises a housing 643 having an interface, such as a connector 644, and a memory chip 642. The memory chip 642 is a flash memory, i.e. a non-volatile data storage that can be electrically erased and re-programmed. The memory chip 642 is programmed with instructions 641 that when loaded (possibly via the connector 644) into a controller, such as the controller 510 of FIG. 5, executes a method or procedure according to the embodiments disclosed above. The USB stick 640 is arranged to be connected to and read by a reading device, such as the base station 500 of FIG. 5 or a separate computer, for loading the instructions into the controller. It should be noted that a computer-readable storage medium can also be other media, such as compact discs, digital video discs, hard drives or other memory technologies commonly used. The instructions can also be downloaded from the computer-readable storage medium via a wireless interface to be loaded into the controller.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for use in a heterogeneous telecommunications system, said heterogeneous telecommunications system comprising a macro base station and a low-power base station, the low-power base station having a coverage which is extendible by range expansion (RE) to serve a user equipment that would otherwise have been served by the macro base station, the method comprising, in either of the macro base station or the low-power base station:
  obtaining information about radio conditions of the user equipment at least with respect to the macro base station;
  determining, based on the obtained information, whether a criterion for conditional range expansion is satisfied, said criterion being related to an uplink transmission power of the user equipment to the macro base station; and
  applying range expansion for the user equipment only when the criterion is satisfied, wherein applying range expansion for the user equipment involves sending a control message to the user equipment, said control message causes the user equipment to apply a certain offset to a received downlink signal strength for the low-power base station so as to change a low-power base station's uptake area in a user equipment's cell-selecting mechanism, further wherein the offset applied to the received downlink signal strength for the low-power base station has a positive value, which serves to increase the low-power base station's uptake area compared to a case where no offset is applied.

2. The method of claim 1, wherein the criterion pertains to the user equipment being subject to a maximum uplink transmission power.

3. The method of claim 1, wherein the criterion pertains to the uplink transmission power of the user equipment exceeding a threshold uplink transmission power.

4. The method of claim 1, wherein the criterion pertains to maximum bit-rates not being reachable for uplink data traffic from the user equipment to the macro base station.

5. The method of claim 1, wherein the criterion pertains to maximum modulation and coding scheme (MCS) not being reachable for uplink data traffic from the user equipment to the macro base station.

6. The method of claim 5, wherein the macro base station and the low-power base station are long term evolution (LTE) compliant and capable of link adaptation where transport format is selected based on link quality, and wherein said obtaining of information about radio conditions of the user equipment involves investigating the link adaptation to identify if maximum MCS has been reached.

7. The method of claim 1, wherein the criterion pertains to a signal to interference and noise ratio (SINR) or signal to noise ratio (SNR) for uplink from the user equipment to the macro base station not meeting a threshold ($SINR_{max\_MCS}$) for maximum modulation and coding scheme (MCS).

8. The method of claim 1, wherein said obtaining of information about radio conditions of the user equipment involves receiving one or more reports originating from the user equipment, said one or more reports including measurements made by the user equipment regarding received power of a reference signal from the macro base station and neighboring base stations in the heterogeneous telecommunications system.

9. The method of claim 8, further comprising, after having received said one or more reports from the user equipment:
analyzing said one or more reports to determine whether the user equipment is positioned in a transition zone where downlink signal strength from the macro base station to the user equipment is the highest, but an uplink path loss from the user equipment is lower to the low-power base station than to the macro base station, and
aborting further execution of the method if the user equipment is found not to be positioned in the transition zone.

10. The method of claim 8, further comprising:
estimating an uplink path loss from the user equipment to the macro base station based on measurements included in said one or more reports from the user equipment and made by the user equipment regarding the received power of the reference signal from the macro base station;
estimating the uplink transmission power of the user equipment based on the estimated uplink path loss from the user equipment to the macro base station; and
determining that said criterion for conditional range expansion is satisfied if the estimated uplink transmission power reaches a predefined maximum power.

11. The method of claim 8, wherein said receiving of one or more reports originating from the user equipment involves receiving the one or more reports forwarded from one of said macro base station and said low-power base station to the other of said macro base station and said low-power base station.

12. The method of claim 1, further comprising:
receiving one or more power headroom reports from the user equipment;
estimating an uplink received signal to interference and noise ratio (SINR) or signal to noise ratio (SNR) for uplink between the user equipment and the macro base station, based on the one or more power headroom reports and a scheduled bandwidth of the user equipment; and
determining that said criterion for conditional range expansion is satisfied, if the estimated SINR or SNR fails to reach a predefined threshold value ($SINR_{max\_MCS}$) representing maximum modulation and coding scheme (MCS).

13. The method of claim 1,
wherein the user equipment as a default is caused to apply the certain offset to the received downlink signal strength for the low-power base station so as to increase the low-power base station's uptake area in the user equipment's cell-selecting mechanism, and
wherein the user equipment is caused to remove said offset in response to determining that maximum bit-rates are reachable for uplink data traffic from the user equipment to the macro base station.

14. The method of claim 1, wherein the information obtained about radio conditions of the user equipment includes measurements by the macro base station or the low-power base station on uplink transmissions from the user equipment.

15. The method of claim 1, wherein the information obtained about radio conditions of the user equipment includes absence of handover reports from the user equipment.

16. A base station for use in a telecommunications system which comprises a macro base station and a low-power base station, the low-power base station having a coverage which is extendible by range expansion (RE) to serve a user equipment which would otherwise have been served by the macro base station, wherein said base station comprises:
a memory for storing instructions and data;
a radio-frequency interface for communicating with said user equipment; and
a controller, wherein the controller is configured to:
obtain information about radio conditions of the user equipment at least with respect to the macro base station;
determine, based on the obtained information, whether a criterion for conditional range expansion is satisfied, said criterion being related to an uplink transmission power of the user equipment to the macro base station;
apply range expansion for the user equipment only when the criterion is satisfied;
receive one or more power headroom reports from the user equipment;
estimate an uplink received signal to interference and noise ratio (SINR) or signal to noise ratio (SNR) for uplink between the user equipment and the macro base station, based on the one or more power headroom reports and a scheduled bandwidth of the user equipment; and determine that said criterion for conditional range expansion is satisfied, if the estimated SINR or SNR fails to reach a predefined threshold value ($SINR_{max\_MCS}$) representing maximum modulation and coding scheme (MCS).

17. The base station of claim 16, being said macro base station.

18. The base station of claim 16, being said low-power base station.

19. A telecommunications system comprising a user equipment, the base station of claim 16, and an additional base station, the base station of claim 16 being either the macro base station or the low-power base station and the additional base station being the other one of the macro base station or the low-power base station.

20. A non-transitory computer-readable medium encoded with computer program instructions that, when loaded and executed by a processor of either a macro base station or a low-power base station in a heterogeneous telecommunications system, the low-power base station having a coverage which is extendible by range expansion (RE) to serve a user equipment that would otherwise have been served by the macro base station, causes the macro base station or the low-power base station to:

obtain information about radio conditions of the user equipment at least with respect to the macro base station;

determine, based on the obtained information, whether a criterion for conditional range expansion is satisfied, said criterion being related to an uplink transmission power of the user equipment to the macro base station;

apply range expansion for the user equipment only when the criterion is satisfied;

receive one or more power headroom reports from the user equipment;

estimate an uplink received signal to interference and noise ratio (SINR) or signal to noise ratio (SNR) for uplink between the user equipment and the macro base station, based on the one or more power headroom reports and a scheduled bandwidth of the user equipment; and determine that said criterion for conditional range expansion is satisfied, if the estimated SINR or SNR fails to reach a predefined threshold value ($SINR_{max\_MCS}$) representing maximum modulation and coding scheme (MCS).

* * * * *